(12) United States Patent
Kaminogo

(10) Patent No.: US 9,871,945 B2
(45) Date of Patent: Jan. 16, 2018

(54) ELECTRONIC EQUIPMENT, DATA SHARING SYSTEM, AND DATA SHARING METHOD

(71) Applicant: KYOCERA Document Solutions Inc., Osaka (JP)

(72) Inventor: Akira Kaminogo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/128,852

(22) PCT Filed: Aug. 27, 2015

(86) PCT No.: PCT/JP2015/074129
§ 371 (c)(1),
(2) Date: Sep. 23, 2016

(87) PCT Pub. No.: WO2016/031889
PCT Pub. Date: Mar. 3, 2016

(65) Prior Publication Data
US 2017/0264778 A1     Sep. 14, 2017

(30) Foreign Application Priority Data
Aug. 28, 2014 (JP) .................................. 2014-173549

(51) Int. Cl.
*H04N 1/32*     (2006.01)
*H04L 29/06*    (2006.01)
(Continued)

(52) U.S. Cl.
CPC ......... *H04N 1/32358* (2013.01); *H04L 63/08* (2013.01); *H04N 1/32539* (2013.01);
(Continued)

(58) Field of Classification Search
CPC ........................... H04N 1/32358; H04L 63/08
See application file for complete search history.

(56) References Cited

U.S. PATENT DOCUMENTS

2005/0251635 A1* 11/2005 Yoshinari ............ G06F 11/1464
                                                    711/162
2011/0043851 A1   2/2011 Tajima
2013/0278956 A1  10/2013 Tajima

FOREIGN PATENT DOCUMENTS

JP    2004-186823     *  2/2004
JP    2004-186823 A      7/2004
(Continued)

*Primary Examiner* — Ibrahim Siddo
(74) *Attorney, Agent, or Firm* — Hawaii Patent Services; Nathaniel K. Fedde; Kenton N. Fedde

(57) ABSTRACT

Electronic equipment is provided where a user can use easily data stored in plurality of electronic equipments while simplifying a system configuration and processing. Electronic equipment is provided having a document box as a document data storage area and connected to a network, the electronic equipment including a capacity inquiring part inquiring about an empty capacity of a document box of the other image forming devices connected via the network based on a document data storage request from a user, an external storage processing part transmitting document data corresponding to the storage request to the other image forming devices for storage when an empty capacity exists, and a data management part managing data stored in the document box of the other image forming devices as data stored in the document box of the own image forming device accessible from the user.

16 Claims, 5 Drawing Sheets

(51) Int. Cl.
*H04N 1/44* (2006.01)
*H04L 29/08* (2006.01)

(52) U.S. Cl.
CPC ........... *H04N 1/4413* (2013.01); *H04L 67/06* (2013.01); *H04N 2201/0039* (2013.01); *H04N 2201/0094* (2013.01)

(56) References Cited

FOREIGN PATENT DOCUMENTS

| | | | |
|---|---|---|---|
| JP | 2005-039411 A | | 2/2005 |
| JP | 2006-135802 | * | 5/2006 |
| JP | 2006-135802 A | | 5/2006 |
| JP | 2008-197875 A | | 8/2008 |
| JP | 2010-186249 A | | 8/2010 |
| JP | 2010-199746 | * | 9/2010 |
| JP | 2010-199746 A | | 9/2010 |
| JP | 2011-044986 A | | 3/2011 |

* cited by examiner

FIG.3

| DOCUMENT NO | DOCUMENT TITLES | ATTRIBUTE 1 (SIZE) | ... | ATTRIBUTE N (STORAGE DESTINATION) |
|---|---|---|---|---|
| 1 | REPORT | 1 | ... | MFP1 (SUBJECT EQUIPMENT) |
| 2 | SCHEDULE TABLE | 1.5 | ... | Printer1 |
| 3 | DEVELOPMENT PLAN DOCUMENT | 0.7 | ... | Printer2 |
| 4 | PRESENTATION MATERIAL | 5.0 | ... | MFP2 |

ELECTRONIC EQUIPMENT, DATA SHARING SYSTEM, AND DATA SHARING METHOD

TECHNICAL FIELD

The present invention relates to electronic equipment, a data sharing system and a data sharing method for making simple use of data that is stored in a plurality of electronic equipments.

BACKGROUND ART

In image forming devices such as printers which are electronic equipment, some image forming devices have a document box function in which for example, document data scanned by a scanner is stored in a storage area called a document box.

In the document box function, the user is allowed to make use of the document data stored in the document box by accessing the document box in the image forming device.

However, in making use of a plurality of image forming devices by connecting thereto by way of such a network as a LAN, since a document box of each image forming device is independent of document boxes of the other image forming devices, when a user attempts to make use of document data in the respective document boxes of the image forming devices, the user needs to access individually the image forming devices.

In contrast with this, Patent Literature 1 discloses a technique in which data stored in multi-function data servers, which are a plurality of electronic equipments connected together by way of a network, can be made available for use easily.

In Patent Literature 1, when each multi-function data server receives a request to refer to data from a user terminal, it is determined whether the access destination is the subject server or the other multi-function server or servers.

In the case of the access destination being the subject server, retrieved data is sent to the terminal of the user who made the data reference request. On the other hand, in the case of the access destination being the other multi-function data server or servers, address information on the multi-function data server or servers of the access destination is obtained from an authentication server, and the multi-function data server or servers are accessed based on the obtained address information to obtain data requested.

Consequently, in the technique disclosed in Patent Literature 1, the user can easily make use of the data stored in the plurality of multi-function data servers without having to access individually the multi-function data servers.

In the technique disclosed in Patent Literature 1, however, in the case of the access destination being the other multi-function data server or servers, the address information on them is obtained from the authentication server provided separately, and therefore, there is caused a problem that the configuration and processing of the system becomes complex.

PRIOR ART LITERATURE

Patent Literature

Patent Literature 1: Japanese Unexamined Patent Publication No. 2010-186249

SUMMARY OF THE INVENTION

Problem that the Invention is to Solve

A problem that the invention is to solve is that when attempting to make easy use of data stored in a plurality of electronic equipments, the configuration and processing of the resulting system becomes complex.

Means for Solving the Problem

According to the invention, there is provided an electronic equipment having a data storage area and connected to a network, including:

a capacity inquiring part that inquires an empty capacity of a storage area of other electronic equipment connected thereto via the network based on a request to store data from a user;

an external storage processing part that transmits data in response to the storage request to the other electronic equipment and stores the data when there is an empty capacity in the storage area of the other electronic equipment; and a data management part that manages data stored in the storage area of the other electronic equipment as data stored in the storage area of the own electronic equipment accessible from the user.

According to the invention, there is provided a data sharing system including a plurality of electronic equipments that are connected to one another via the network and have their own data storage areas, and wherein one or more of the plurality of electronic equipments are the electronic equipment described above.

According to the invention, there is provided a data sharing method for an electronic equipment having a data storage area and connected to a network, the method including inquiring an empty capacity of a storage area of other electronic equipment that is connected thereto via the network based on a request to store data from a user, transmitting data in response to the storage request to the other electronic equipment for storage of the data when there is an empty capacity in the storage area of the other electronic equipment, and managing data stored in the storage area of the other electronic equipment as data stored in the storage area of the own electronic equipment accessible from the user.

Advantage of the Invention

The electronic equipment of the invention enables the user to access the data of the own electronic equipment and the other electronic equipment as the data stored in the storage area of the own electronic equipment without providing a separate server. Thus, the user is enabled to use easily the data stored in the plurality of electronic equipments while simplifying the configuration and processing of the system.

BRIEF DESCRIPTION OF DRAWINGS

FIG. 3 is a chart showing an example of a box information table.

MODE FOR CARRYING OUT THE INVENTION

An object to use easily data stored in a plurality of electronic equipments while simplifying the configuration and processing of a system is achieved by electronic equipment that manages data stored in a storage area of other electronic equipment as data stored in a storage area of the own electronic equipment accessible from the user.

Embodiment 1

[Summary of Data Sharing System]

Figure 1:
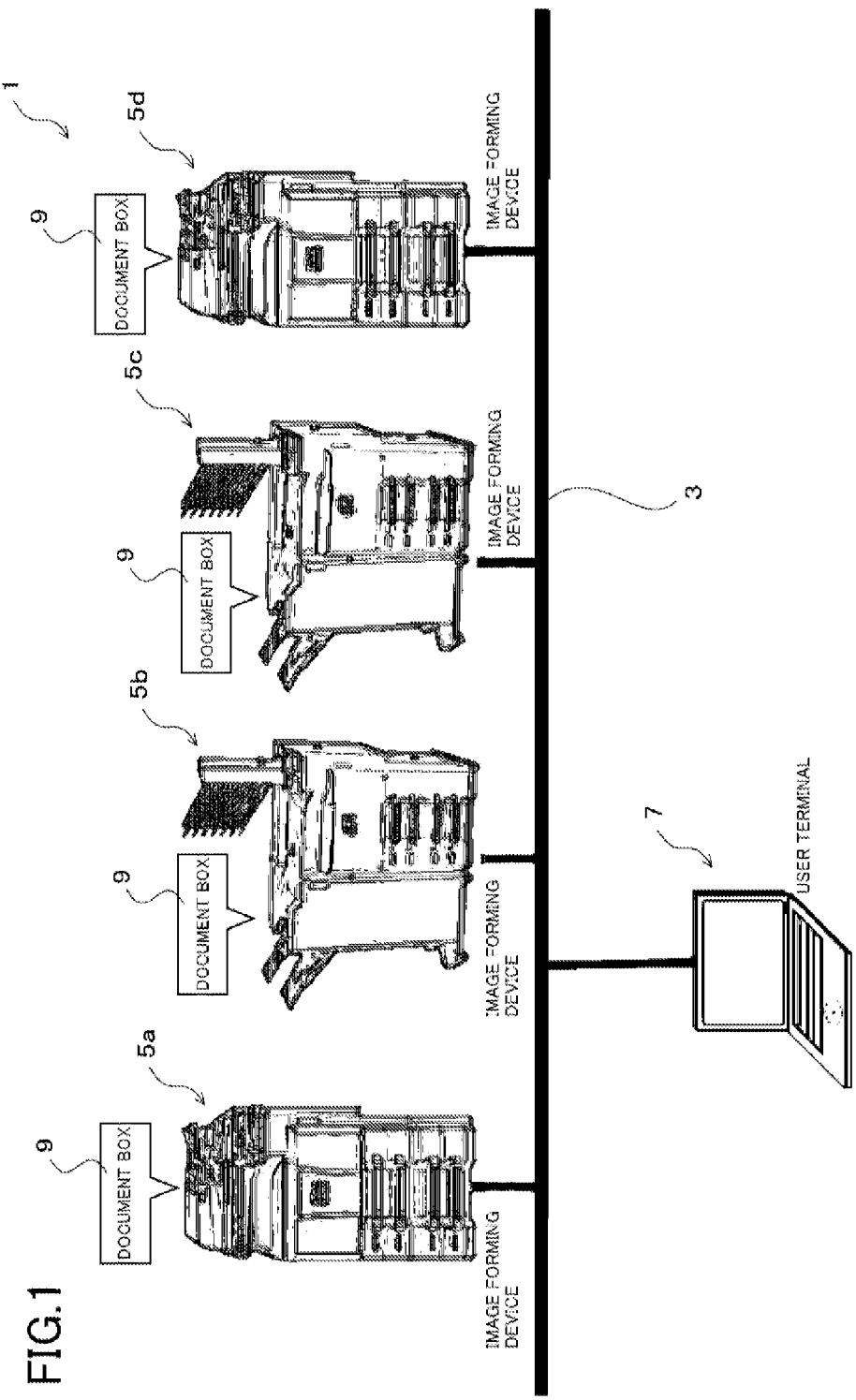
FIG. 1 is a conceptual diagram showing a data sharing system according to Embodiment 1 of the present invention.

FIG. 1 is a conceptual diagram showing a data sharing system according to an embodiment of the invention.

As shown in FIG. 1, a data sharing system 1 is configured by image forming devices 5a, 5b, 5c and 5d as a plurality of electronic equipments and a user terminal 7 that are connected to one another by a network 3 such as a LAN.

The image forming devices 5a to 5d are printers and multi-function equipment. In an example shown in FIG. 1, the image forming devices 5a and 5d are multi-function equipment, and the image forming devices 5b and 5c are printers. The number and type of image forming devices can be changed as required.

The image forming devices 5a to 5d each have a document box function, so that document data scanned by a scanner or document data received from the user terminal 7 can be stored in a storage area called a document box 9. The document data in the document box 9 can be used for browsing or printing or the like by each of the image forming devices.

The user terminal 7 is an information processing device such as a personal computer can store document data in the document boxes 9 of the image forming devices 5a to 5d and can make use of the document data of stored for browsing or the like.

In the data sharing system 1 of the present embodiment, when a user accesses the document box 9 of anyone of the image forming devices 5a to 5d, for example the image forming device 5a, from the user terminal 7, the user can make use of document data stored in the document boxes 9 of the other image forming devices 5b to 5d as document data in the document box 9 of the image forming device 5a. The details of the data sharing system 1 will be described together with the configuration of the image forming device 5a.

[Image Forming Device]

Figure 2:
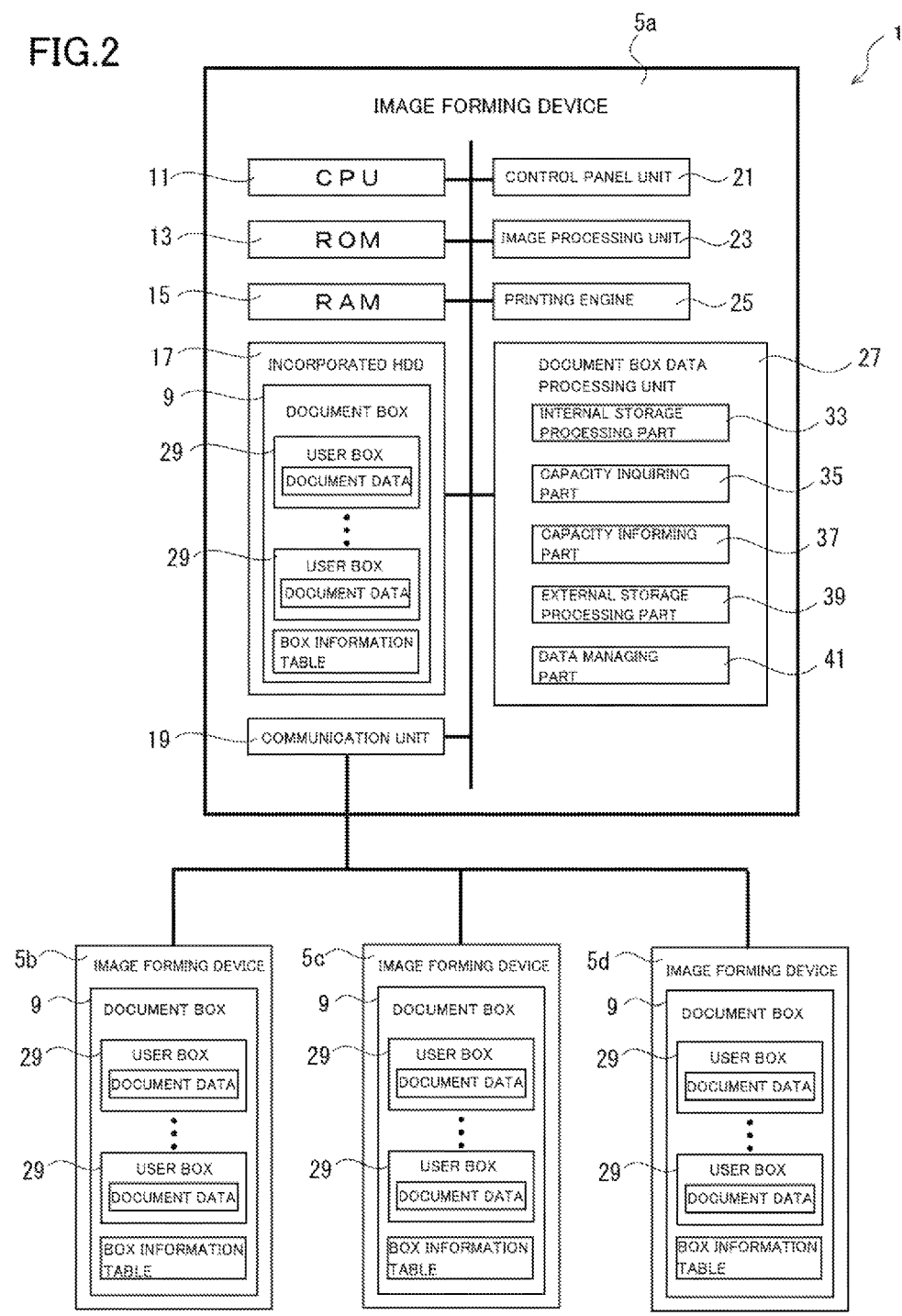
FIG. 2 is a block diagram of the data sharing system shown in FIG. 1.

FIG. 2 is a block diagram showing the data sharing system 1 shown in FIG. 1. In FIG. 2, since the image forming devices 5b to 5d have the same configuration as that of the image forming device 5a, the detailed description of the image forming devices 5b to 5d are omitted. In addition, in FIG. 5, the user terminal 7 is omitted.

The image forming device 5a of the present embodiment includes a CPU (Central Processing Unit) 11, a ROM (Read Only Memory) 13, a RAM (Random Access Memory) 15, an incorporated HDD (Hard Disk Drive) 17, a communication unit 19, a control panel unit 21, an image processing unit 23, a printing engine 25 and the like, as well as a document box data processing unit 27.

The CPU 11 is a control unit that executes a program to control the constituent units of the image forming device 5a or to control them to work.

The ROM 13 and the RAM 15 are main storage units, and the ROM 13 stores applications for various controls and data necessary for the controls, while the RAM 15 functions as a working area to store data temporarily.

The incorporated HDD 17 is an auxiliary storage unit that stores data permanently. The document box 9 is provided in the incorporated HDD 17, and a user specific inherent storage area is secured for each user as a user box 29 in the document box 9 for use by the user when he or she is authenticated.

The communication unit 19 is an interface that connects the image forming device 5a to the other image forming devices 5b to 5d and the user terminal 7 via the network 3 so that data can be transmitted and received among them.

The control panel unit 21 has a touch panel type liquid crystal display screen on which controls and inputs made to the image forming device 5a or controlling conditions thereof can be displayed. Consequently, the control panel unit 21 also functions as a screen of the image forming device 5a.

The image processing unit 23 is a control module having a processor, a ROM and the like and generates printing data by analyzing jobs based on document data in the document box 9 or document data received from the user terminal 7.

The printing engine 25 is a mechanism unit that executes printing and forms an image on a sheet of paper based on printing data generated at the image processing unit 23.

The document box data processing unit 27 is a control module having a processor, a ROM and the like and functions as an internal storage processing part 33, a capacity inquiring part 35, a capacity informing part 37, an external storage processing part 39, and a data managing part 41 by executing programs. The CPU 11 can take instead the functions of these constituent modules of the document box data processing unit 27.

The internal storage processing part 33 realizes a internal storage processing function and stores document data corresponding to, in response to a storage request from a user in the document box 9 of the image forming device 5a functioning as subject equipment. In the present embodiment, the document data corresponding to the storage request (hereinafter, referred to as "storage target data") is stored in a user box 29 in the document box 9 that is assigned to a user who logs in. However, the document data can be stored only when an empty capacity of the document box 9, in particular, the user box 29 is greater than a data volume of the document data.

The user is allowed to log in based on authentication information such as a user ID, a password and the like that the user inputs on the control panel unit 21 of the image forming device 5a or the user terminal 7. This user authentication can be executed locally in an interior of the image forming device 5a or in an authentication server. The user authentication may be executed in either of the two ways.

When the user makes a storage request for, for example, printing, copying or scanning, the user inputs an instruction to store document data in the user box 29 on the control panel 21 of the image forming device 5a or the user terminal 7. In addition, the user can also access the user box 29 from the user terminal 7 using a browser or the like to store document data therein without printing it.

The capacity inquiring part 35 realizes a capacity inquiring function and inquires as to empty capacities of the user boxes 29 in the document boxes 9 of the other image forming devices 5*b* to 5*d* that are connected thereto via the network 3 based on a storage request from a user.

This inquiry as to the empty capacities is executed when an empty capacity of the user box 29 in the document box 9 of the image forming device 5*a* is smaller than the data volume of the storage target data or when a request to back up the document data is being made. Such a request to back up document data can be made by setting the equipment at the image forming device 5*a*, setting the user box 29 or setting the storage request.

When inquiring as to the empty capacity of the user box 29, the capacity inquiring part 35 inquires as to whether there exists a user box 29 that is assigned to the user and the empty capacity of the user box 29 based on authentication information such as the user ID and the password of the user.

The capacity informing part 37 realizes an empty capacity informing function and informs the other image forming devices 5*b* to 5*d* that are the origins of the inquiry of an empty capacity of the user box 29 of subject equipment. The capacity informing part 37 functions when the user accesses anyone of the other image forming devices 5*b* to 5*d*, that is, when the image forming device 5*a* functions as one the other image forming devices.

The external storage processing part 39 realizes an external storage processing function and transmits the storage target data to the other image forming devices 5*b* to 5*d* for storage therein when empty capacities exist in the user boxes 29 of the document boxes 9 of the other image forming devices 5*b* to 5*d*.

When referred to here, the empty capacity means that the empty capacity is greater than a data volume of the storage target data. It is determined based on the empty capacities of the user boxes 29 of the image forming devices 5*b* to 5*d* that are informed therefrom.

The data managing part 41 realizes a data managing function and manages data stored in the user boxes 29 of the other image forming devices 5*b* to 5*d* as data stored in the user box 29 of the image forming device 5*a* functioning as subject equipment for access from the user.

Specifically speaking, the data managing part 41 creates a list of the document data in the user box 29 of the image forming device 5*a* and the data in the user boxes 29 of the image forming devices 5*b* to 5*d* as the data stored in the user box 29 of the image forming device 5*a* and provides the list created to the user to use the user box 29 of the image forming device 5*a*. Providing the list should be executed via the control panel unit 21 of the image forming device 5*a* or the user terminal 7.

The list of the present embodiment is created as a box information table. FIG. 3 shows an example of a box information table.

The box information table is made up of document numbers, document titles, and a plurality of attributes 1 to N and the like. The attributes are a data volume (size) of a document data as attribute 1, the document data storage destination as attribute N and the like. In storage destinations in FIG. 3, MFP1, Printer 1, Printer 2 and MFP2 denote the image forming devices 5*a*, 5*b*, 5*c*, and 5*d*, respectively.

The box information table is created, for example, when the image forming device 5*a* is activated and is then stored on the incorporated HDD 17 or the like. This is also true with the other image forming devices 5*b* to 5*d*, and the common box information table is stored. Once created, the box information table is updated thereafter every time the image forming device 5*a* is activated and document data is stored or updated periodically.

In preparing the box information table, the data managing part 41 inquires information about the user box 29 of the other image forming devices 5*b* to 5*d* as to, for example, whether or not the user box 29 exists, whether or not document data exists in the user box 29 and the document data title and attribute based on authentication information of the user.

Then, the data managing part 41 creates a box information table like the one shown in FIG. 3 from reply information from the image forming devices 5*b* to 5*d* to the inquiries made thereto and information on the document data in the user box 29 of the image forming device 5*a* functioning as the subject equipment and stores the table created in the incorporated HDD 17. In the event that a box information table exists already in the user box 29, for example, the existing box information table should be updated by adding the information on the document data newly stored to the existing box information table.

When there are inquiries of information about the user box 29 by the other image forming devices 5*b* to 5*d*, the data managing part 41 informs the other image forming devices 5*b* to 5*d* which are the origins of the inquiries of the information.

[Data Sharing Process]

Figure 4:
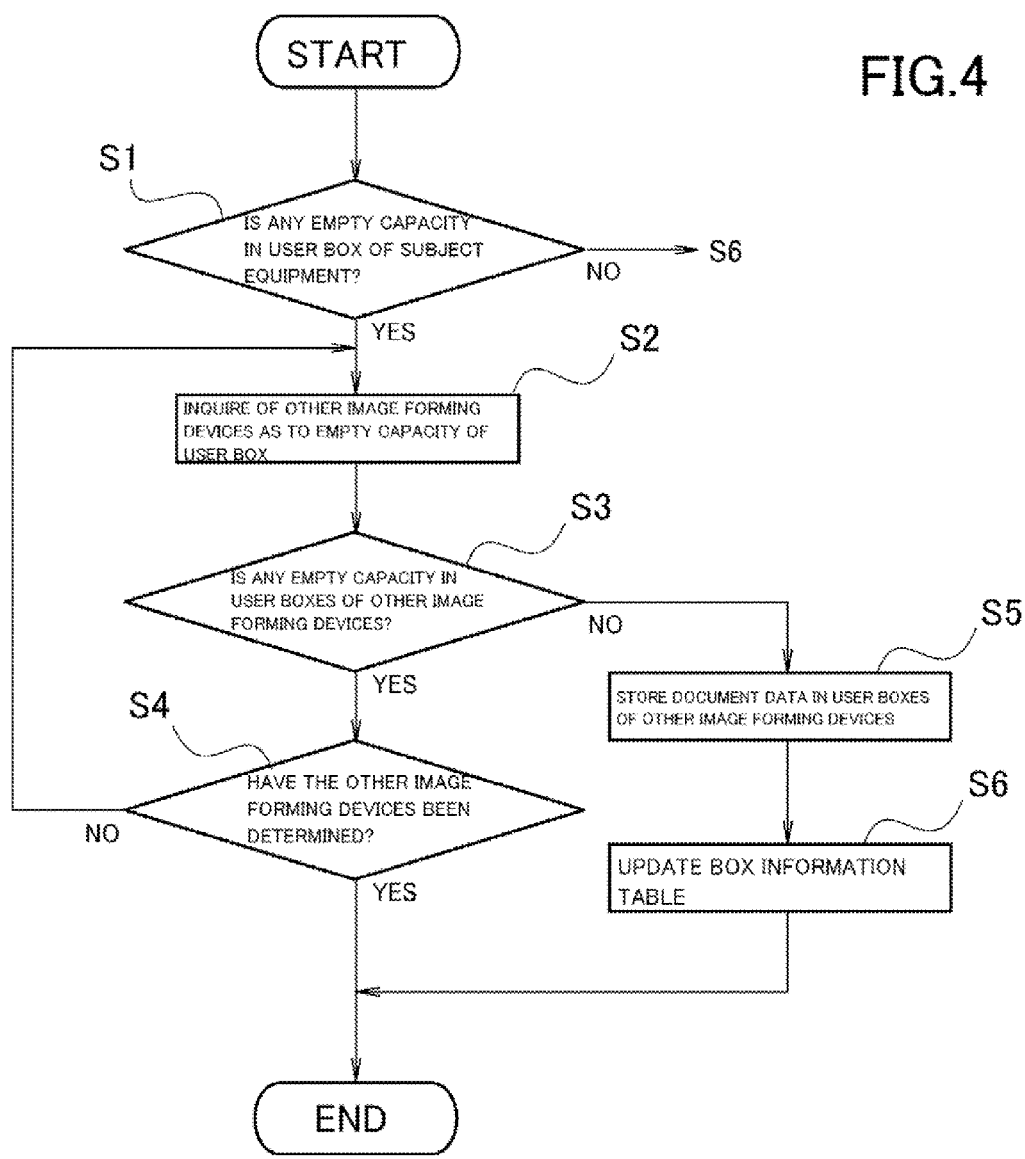
FIG. 4 is a flowchart showing a data sharing process performed by the data sharing system according to Embodiment 1 of the present invention.

Hereinafter, a procedure of data sharing process by the data sharing system 1 will be described. FIG. 4 is a flowchart showing a data sharing process to be executed by the data sharing system 1 according to Embodiment 1 of the present invention.

FIG. 4 shows an example in which when the empty capacity of the user box 29 of the image forming device 5*a* is smaller than the data volume of the storage target data, the document data is stored in the user box 29 of anyone of the other image forming devices 5*b* to 5*d*. Also, when a request to back up the document data is being made, the same process as that shown in FIG. 4 can be executed basically only with a different trigger.

In the case of the data sharing process shown in FIG. 4, for example, in executing printing, copying or scanning at the image forming device 5*a*, the requested operation is started by the designation of a request to store document data. As this occurs, in the present embodiment, it is understood that the user logs in on the image forming device 5*a*.

Logging in is executed by inputting the authentication information of the user on the image forming device 5*a* in the way described above. In executing printing, scanning or the like, the authentication information is inputted on the control panel unit 21 of the image forming device 5*a*. On the other hand, in executing printing or the like, the authentication information is inputted when a job is transmitted on a driver of the user terminal 7.

In step S1, an inquiring process "Is any empty capacity in the user box of the subject equipment?" is executed. Namely, the internal storage processing part 33 of the image forming device 5*a* determines whether or not the empty capacity of the user box 29 of the subject equipment is smaller than the data volume of the storage target data.

If the internal storage processing part 33 determines that the empty capacity of the user box 29 is smaller than the data volume of the storage target data, determining that there is no empty capacity, the process proceeds to step S2 (YES). On the other hand, if the internal storage processing part 33 determines that the empty capacity of the user box 29 is greater than the data volume of the storage target data, determining that there is an empty capacity, the internal storage process part 33 stores the storage target data in the user box 29, and the process proceeds to step S6.

In step S2, an inquiring process "inquiring as to empty capacities of the user boxes of the other image forming devices" is executed. Namely, the capacity inquiring part 35 of the image forming device 5a inquires of anyone of the other image forming devices 5b to 5d as to whether or not a user box 29 exists and an empty capacity thereof based on the authentication information of the user such as the user ID and the password. In the following description, anyone of the other image forming devices 5b to 5d that makes up the inquiry destination is referred to as an inquiry destination image forming device 5.

In response to the inquiry of image forming device 5a, a capacity informing part 37 of the inquiry destination image forming device 5 informs the image forming device 5a that is the origin of the inquiry about a notice of the empty capacity of the user box 29.

The process in step S2 is completed in this way, and the process proceeds to step S3.

In step S3, an inquiring process "Is any empty capacity in the user box of the other image forming devices?" is executed. Namely, the capacity inquiring part 35 of the image forming devices 5a determines that, based on the empty capacity of the user box 29 that is informed from the inquiry destination image forming device 5, the empty capacity is greater than the data volume of the storage target data.

If the capacity inquiring part 35 determines that the empty capacity of the user box 29 of the inquiry destination image forming device 5 is smaller than the data volume of the storage target data, the process proceeds to step S4 (YES). On the other hand, if the capacity inquiring part 35 determines that the empty capacity of the user box 29 of the inquiry destination image forming device 5 is greater than the data volume of the storage target data, determining that there exists the empty capacity, the process proceeds to step S5 (NO).

In step S4, an inquiring process "Have all the other image forming devices been determined?" is executed. Namely, the capacity inquiring part 35 of the image forming device 5a ends the process in case all the other image forming devices 5b to 5d have been checked to be determined (YES).

In ending the process, an error message may be displayed on the control panel unit 21 of the image forming device 5a or the user terminal 7. Alternatively, an error log may be accumulated on the incorporated HDD 17 of the image forming device 5a.

On the other hand, if the capacity inquiring part 35 of the image forming device 5a determines that there still exist the image forming devices 5b to 5d that have not yet been checked to be determined, the process returns to step S2 where the process is repeated (NO).

In this way, in case the other image forming devices 5b to 5d are selected sequentially for determination on whether or not the empty capacity exists in the user box thereof, the process can proceed to step S5 at a point in time when the capacity inquiring part 35 determines that there exists the empty capacity, thereby making it possible to simplify the process. A selection order in selecting the other image forming devices 5b to 5d sequentially can be set arbitrarily.

In step S5, the "document data is stored in the user box of the other image forming device." Namely, the external storage processing part 39 of the image forming device 5a transmits the storage target data to the inquiry destination image forming device 5 where the empty capacity is determined to exist. In the inquiry destination image forming device 5, the internal storage processing part 33 stores the storage target data received in the user box 29 of the subject equipment.

The process in step S5 is completed in this way, and the process proceeds to step S6.

In step S6, the "box information table is updated." Namely, the data managing part 41 of the image forming device 5a updates the existing box information table (FIG. 3) by adding information of the storage target data stored in the user box 29 of the inquiry destination image forming device 5 in step S5. Additionally, in case the process proceeds to this step from step S1, the data managing part 41 of the image forming device 5a adds the information of the storage target data stored in the user box 29 of the subject equipment to the existing box information table.

In the image forming device 5a, the box information table has already been created or updated when it is activate. In this step, the existing box information table is updated.

In the inquiry destination image forming device 5 where the storage target data is stored, the existing box information table can be updated based on the information stored. On the other hand, in the remaining of the image forming devices 5b to 5d where the storage target data is not stored, the box information table is updated upon receipt of a notice from the image forming device 5a or the like (a push type). Alternatively, the box information table should be updated by making periodical inquiries (a pull type). In this way, all the image forming devices 5a to 5d come to have the common box information table.

Whether the box information table is updated through the push type or the pull type can be set as required in consideration of the number of image forming devices in the network 3 or the frequency with which the document boxes 9 are used.

In case the process in step S6 is completed in this way, the data sharing process ends. Thereafter, when the user accesses the user box 29 of the image forming device 5a, the data managing part 41 of the image forming device 5a provides the user with the box information table, whereby the user can access not only the document data stored in the user box 29 of the image forming device 5a but also the document data stored in the user boxes 29 of the image forming devices 5b to 5d as the document data stored in the user box 29 of the image forming device 5a.

In FIG. 4, the image forming device 5a is described as functioning as the subject equipment. However, the same process can be executed even when anyone of the other image forming devices 5b to 5d functions as the subject equipment. For example, in case the image forming device 5b functions as the subject equipment, the other image forming devices should be the image forming devices 5a, 5c and 5d.

[Advantage of Embodiment 1]

The image forming device 5a of the present embodiment is the electronic equipment having the document box 9 that is the document data storage area and configured to be connected to the network 3 and includes the capacity inquiring part 35 that inquires as to the empty capacities of the document boxes 9 of the other image forming devices 5b to 5d that are connected to one another via the network 3 based on the request to store document data from the user, the external storage processing part 39 that transmits the document data corresponding to the request to store document data to the other image forming devices 5b to 5d when the empty capacity exists in the document boxes 9 of the other image forming devices 5b to 5d, and the data managing part 41 that manages the document data stored in the document boxes 9 of the image forming devices 5b to 5d as the data stored in the document box 9 of the subject equipment for access from the user.

Thus, the image forming device 5a of the present embodiment allows the document data stored in the subject equipment and the other image forming devices 5b to 5d to be accessed by the user as the data stored in the document box 9 of the subject equipment. As a result, in the present embodiment, the document data stored in the plurality of the image forming devices 5a to 5d can be used easily while simplifying the configuration and process of the system without providing a separate server.

In addition, the image forming device 5a of the present embodiment includes the internal storage processing part 33 that stores the storage target data corresponding to the request to store document data in the document box 9 of the subject equipment, and the capacity inquiring part 35 inquires as to the empty capacities of the other image forming devices 5b to 5d when the empty capacity of the document box 9 of the subject equipment is smaller than the data volume of the storage target data.

Consequently, in the present embodiment, even when the capacity of the incorporated HDD 17 of the image forming device 5a in use is relatively small or insufficient, the empty capacities of the other image forming devices 5b to 5d that are connected to one another on the same network 3 can be made effective use of. Moreover, the user should do the same control as that when the user uses the document box 9 of the image forming device 5a, and no specific control is required, resulting in the extremely high usability. This becomes remarkable in particular when the user uses daily the document box 9 of the image forming device 5a.

The inquiries on the empty capacities at the other image forming devices 5b to 5d can be executed quickly and easily in the interior of the image forming device 5a in case the empty capacities at the other image forming devices 5b to 5d are added to the box information table.

The document box 9 of the image forming device 5a has the user specific user box 29 that can be used by the authenticated user, and the capacity inquiring part 35 inquires as to the empty capacities of the user boxes 29 of the other image forming devices 5b to 5d based on the authentication information for authentication of the user when the empty capacity of the user box 29 of the image forming device 5a is smaller than the data volume of the storage target data.

Consequently, in the image forming device 5 of the present embodiment, even when the document data is stored in the user box 29 that requires the authentication of the user, the same working effect as that described above can be provided.

In addition, the capacity inquiring part 35 of the image forming device 5a inquires as to the empty capacities at the other image forming devices 5b to 5d when the request to back up the document data is being made.

Thus, in the present embodiment, in the same processing as that executed when the capacity of the incorporated HDD 17 of the image forming device 5a in use is relatively small or insufficient, the document data can be backed up by making effective use of the empty capacities at the other image forming devices 5b to 5d that are connected to one another on the same network 3.

The data managing part 41 of the image forming device 5a creates the document data in the user box 29 of the subject equipment and the document data in the user boxes 29 of the other image forming devices 5b to 5d into the box information table as the document data stored in the document box 9 of the subject equipment for use by the user.

Consequently, in the image forming device 5a of the present embodiment, the user can access the document data stored in the subject equipment and the other image forming devices 5b to 5d easily and in an ensured fashion as the document data stored in the document box 9 of the subject equipment.

Even in the event that anyone of the other image forming devices 5b to 5d is made to function as the subject equipment, the same working effect as that provided when the image forming device 5a functions as the subject equipment can be provided.

In the data sharing system 1, one or more, or all in the present embodiment of the image forming devices 5a to 5d provide the working effect described above, whereby even in the event that the user accesses the document box 9 of anyone of the image forming devices 5a to 5b, the same working effect as that described above can be provided, thereby making it possible to configure the system of the high usability from the user's point of view easily.

The data sharing program of the present embodiment enables the image forming device 5a to provide the working effect described above by realizing the functions of the each of units of the image forming device 5a.

The data supply system program of the present embodiment enables the data sharing system 1 to provide the working effect described above by causing the each of units of the image forming device 5a to realize their functions.

Embodiment 2

Figure 5:
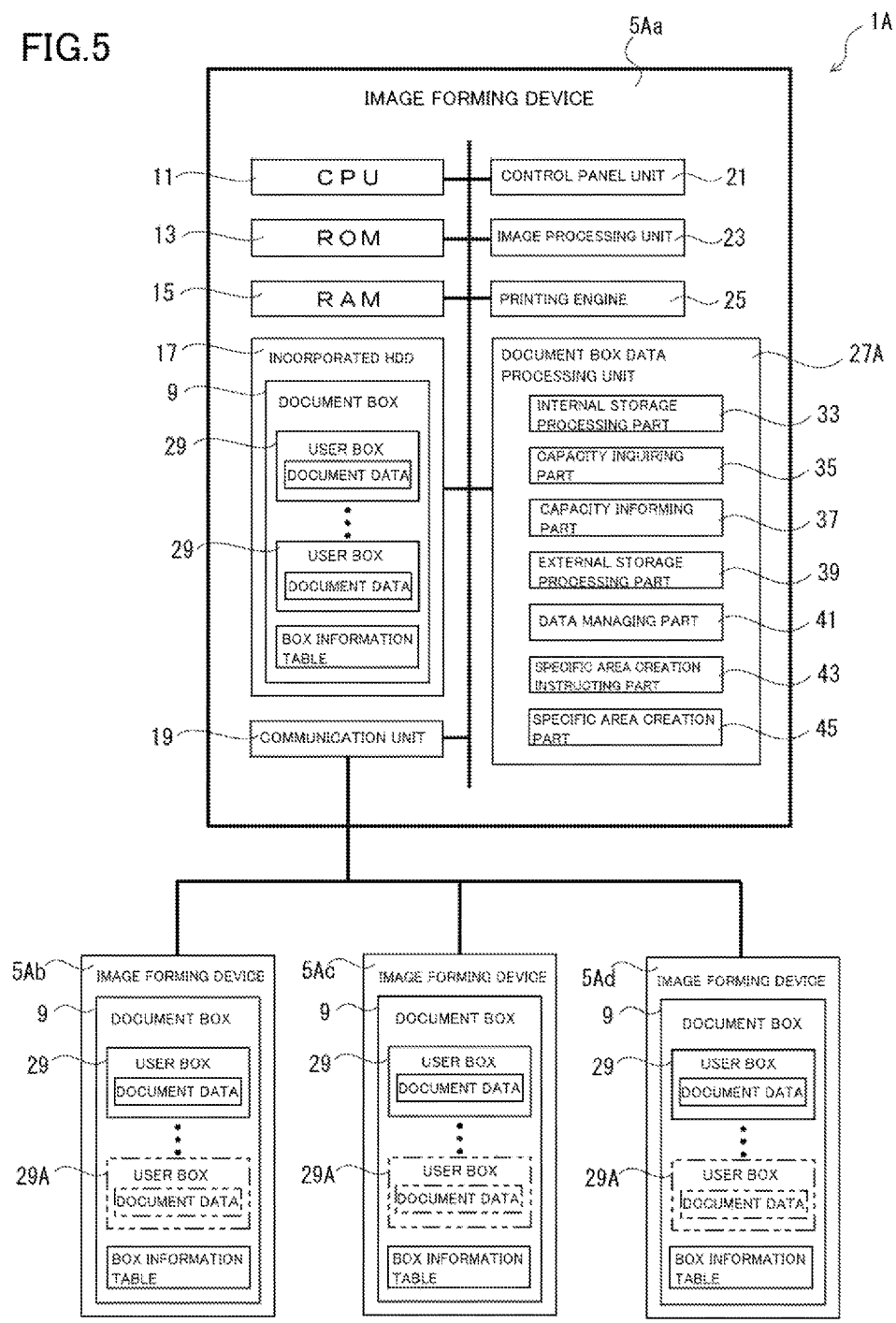
FIG. 5 is a block diagram of a data sharing process performed by a data sharing system according to Embodiment 2 of the present invention.

FIG. 5 is a block diagram showing a data sharing system according to Embodiment 2 of the invention and corresponds to FIG. 2 of Embodiment 1. Since Embodiment 2 has a basic configuration that is common to Embodiment 1, like reference numerals or like reference numerals suffixed with A are given to like constituent portions, and the repetition of similar descriptions to those made in Embodiment 1 will be omitted here.

In a data sharing system 1A of the present embodiment, document box data processing unit 27A of image forming devices 5Aa to 5Ad functions as a specific area creation instructing part 43 and a specific area creation part 45. In the present embodiment, too, the image forming device 5Aa will be described as functioning as subject equipment.

The specific area creation instructing part 43 realizes a specific area creation instructing function and transmits authentication information for authentication of a user to the other image forming devices 5Ab to 5Ad to create a user box 29A in the event that no user boxes 29 exist in the other image forming devices 5Ab to 5Ad.

The instruction to create a user box 29A is issued at a timing at which it is determined that no user box 29 exists in the other image forming devices 5Ab to 5Ad. Alternatively, the instruction to create a user box 29A may be issued at a point in time when it is determined that no user box 29 exists in anyone of the image forming devices 5Ab to 5Ad that is first inquired of as to the existence of a user box 29A.

In addition, the creation of a user box 29A may be configured so that whether or not a user box 29A is created automatically is set at the other image forming devices 5Ab to 5Ad so that a user box 29A can be created only in the image forming devices 5Ab to 5Ad where the automatic preparation is set.

The specific area creation part 45 realizes a specific area creation function and provides a user box 29A in a document box 9 based on the authentication information transmitted thereto from the other image forming devices 5Ab to 5Ad in the event that no user box 29 exists in the document box 9.

In the present embodiment, too, no user box 29A needs to be provided in the other image forming devices 5Ab to 5Ad that are connected to one another on the same network 3. The same working effect as that provided by Embodiment 1 can be provided only by performing operations similar to those performed by creating the document box 9 in the image forming device 5a for use, and the usability becomes extremely high.

[Others]

Thus, while the embodiments of the invention have been described heretofore, the invention is not limited thereto but can be altered or modified variously.

For example, in the present embodiments, while the image forming devices 5a to 5d and the image forming devices 5Aa to 5Ad are described as functioning as electronic equipment, electronic equipment should be any device that has a data storage area and which is connected to the network, and hence, a server or the like can be used as electronic equipment.

The invention claimed is:

1. An electronic equipment having a data storage area and connected to a network, comprising:
   a storage unit that is provided with a data storage area in which a user specific inherent storage area is secured for each of a plurality of users, wherein the plurality of users comprises a first user;
   an internal storage processing part that stores data, corresponding to a request to store the data from the first user, to the user specific inherent storage area corresponding to the first user in the electronic equipment when there is an empty capacity in the user specific inherent storage area corresponding to the first user;
   a capacity inquiring part that inquires about an empty capacity of a storage area of an other electronic equipment connected to the electronic equipment via the network based on the storage request;
   an external storage processing part that transmits the data in response to the storage request to the other electronic equipment for storage of the transmitted data in the other electronic equipment when there is an empty capacity in a user specific inherent storage area corresponding to the first user in the other electronic equipment and there is no empty capacity in the user specific inherent storage area corresponding to the first user in the electronic equipment; and
   a data management part that manages data stored in the user specific inherent storage area corresponding to the first user in the other electronic equipment as data stored in the user specific inherent storage area corresponding to the first user in the electronic equipment accessible from the first user,
   wherein the user specific inherent storage area of the other electronic equipment and the user specific inherent storage area of the electronic equipment that both correspond to the first user are managed as the same user specific inherent storage area.

2. The electronic equipment according to claim 1, further comprising:
   an internal storage processing part that stores data in response to the storage request to the storage area of the electronic equipment, and wherein
   the capacity inquiring part makes an inquiry about an empty capacity of the other electronic equipment when an empty capacity of the storage area of the electronic equipment is smaller than a data volume in response to the storage request.

3. The electronic equipment according to claim 2, wherein the storage area of the electronic equipment has a user specific inherent storage area that can be used by authenticating the user, and wherein
   the capacity inquiring part makes an inquiry about an empty capacity of a specific storage area of the other electronic equipment based on authentication information for use in user authentication when an empty capacity of the specific storage area of the storage area of the electronic equipment is smaller than the data volume in response to the storage request.

4. The electronic equipment according to claim 3, wherein:
   an specific area creation instructing part transmits the authentication information to the other electronic equipment to cause the other electronic equipment to create a specific storage area when no specific storage area exists in the storage area of the other electronic equipment.

5. The electronic equipment according to claim 1, wherein the capacity inquiring part makes an inquiry about an empty capacity of the other electronic equipment when a request to backup the data is made.

6. The electronic equipment according to claim 1, wherein the data management part creates a list of data in the user specific inherent storage area of the electronic equipment and data in the user specific inherent storage area of the other electronic equipment as data stored in the storage area of the electronic equipment and makes the list available to the first user.

7. A data sharing system having the electronic equipment according to claim 1, comprising:
   a plurality of electronic equipments that are connected to one another via the network and have their own data storage areas, and wherein
   one or more of the plurality of electronic equipments are the electronic equipment according to claim 1; and
   one or more of the plurality of equipments are the other electronic equipment.

8. The electronic equipment according to claim 6, wherein the data management part updates the list of data when the electronic equipment is activated or when data is stored, or updates the list of data periodically.

9. The data sharing system according to claim 7, wherein the data corresponding to the storage request that is transmitted by the external storage processing part to the other electronic equipment is transmitted to cause the other electronic equipment to store, by an internal storage processing part of the other electronic equipment, the transmitted data in the user specific inherent storage area corresponding to the first user in the other electronic equipment.

10. The data sharing system according to claim 7, wherein the data management part creates a list of data in the user specific inherent storage area of the electronic equipment and data in the user specific inherent storage area of the other electronic equipment as data stored in the storage area of the electronic equipment and makes the list available to the first user.

11. The data sharing system according to claim 10, wherein the data management part updates the list of data when the electronic equipment is activated or when data is stored, or updates the list of data periodically.

12. The electronic equipment according to claim 1, wherein
the data corresponding to the storage request that is transmitted by the external storage processing part to the other electronic equipment is transmitted to cause the other electronic equipment to store, by an internal storage processing part of the other electronic equipment, the transmitted data in the user specific inherent storage area corresponding to the first user in the other electronic equipment.

13. A data sharing method for an electronic equipment having a data storage area and connected to a network, wherein the electronic equipment is accessible from a first user and the data storage area comprises a user specific inherent storage area for each of a plurality of users, wherein the plurality of users comprises the first user, the method comprising:
storing data, corresponding to a request to store data from the first user, to the user specific inherent storage area corresponding to the first user when there is an empty capacity in the user specific inherent storage area corresponding to the first user;
inquiring about an empty capacity of a storage area of an other electronic equipment that is connected to the electronic equipment via the network based on the storage request;
transmitting data in response to the storage request to the other electronic equipment for storage of the transmitted data when there is an empty capacity in a user specific inherent storage area corresponding to the first user in the other electronic equipment and there is no empty capacity in the user specific inherent storage area corresponding to the first user in the electronic equipment; and
managing data stored in the user specific inherent storage area corresponding to the first user in the other electronic equipment as data stored in the user specific inherent storage area corresponding to the first user in the electronic equipment accessible from the first user, wherein the user specific inherent storage area of the other electronic equipment and the user specific inherent storage area of the electronic equipment that both correspond to the first user are managed as the same user specific inherent storage area.

14. The method according to claim 13, wherein:
the data corresponding to the storage request that is transmitted to the other electronic equipment is transmitted to cause the other electronic equipment to store, by an internal storage processing part of the other electronic equipment, the transmitted data in the user specific inherent storage area corresponding to the first user in the other electronic equipment.

15. The method according to claim 13, further comprising creating a list of data in the user specific inherent storage area of the electronic equipment and data in the user specific inherent storage area of the other electronic equipment as data stored in the storage area of the electronic equipment and making the list available to the first user.

16. The method according to claim 15, further comprising updating the list of data when the electronic equipment is activated or when data is stored, or updating the list of data periodically.

* * * * *